Nov. 15, 1966 W. E. LEWIS 3,286,080
SELF-CLEANING CONVERSION MEANS FOR DOMESTIC OVEN
Filed Nov. 29, 1963 2 Sheets-Sheet 1

INVENTOR.
WALTER E. LEWIS
BY Richard L. Caslin
HIS ATTORNEY

Nov. 15, 1966  W. E. LEWIS  3,286,080
SELF-CLEANING CONVERSION MEANS FOR DOMESTIC OVEN
Filed Nov. 29, 1963  2 Sheets-Sheet 2
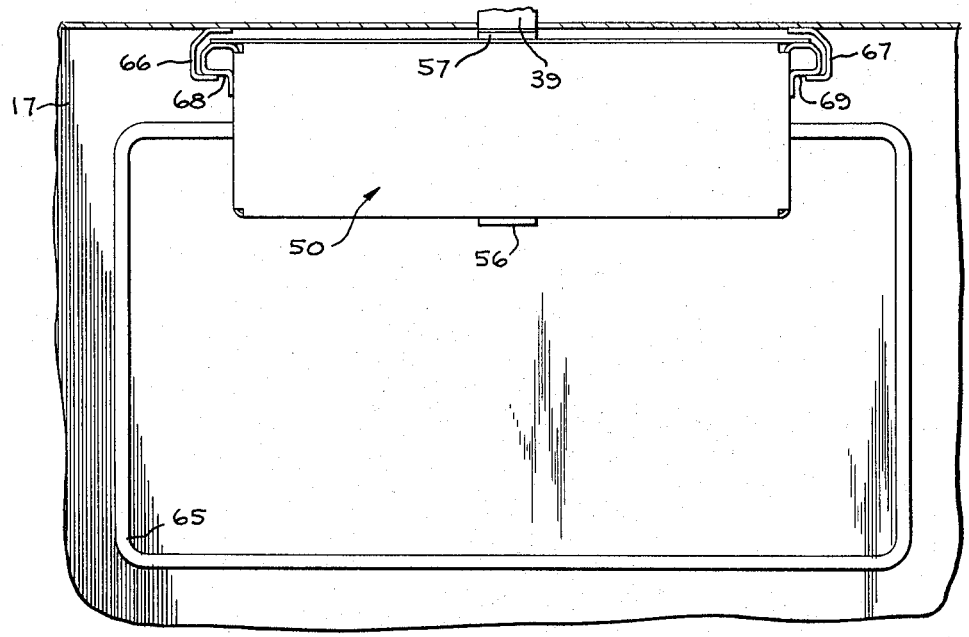
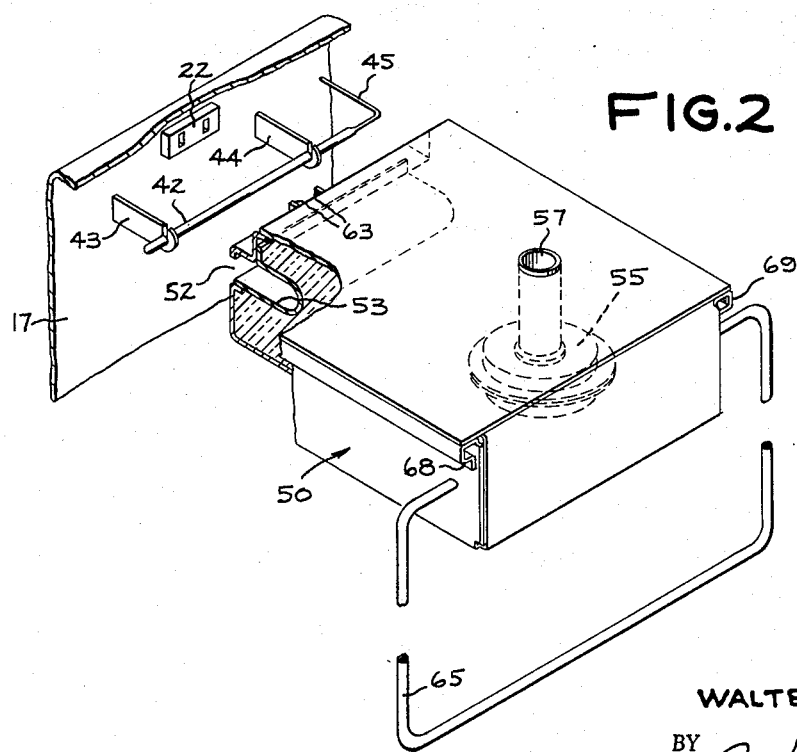
INVENTOR.
WALTER E. LEWIS
BY Richard L. Caslin
HIS ATTORNEY United States Patent Office 3,286,080
Patented Nov. 15, 1966

3,286,080
SELF-CLEANING CONVERSION MEANS FOR DOMESTIC OVEN
Walter E. Lewis, Louisville, Ky., assignor to General Electric Company, a corporation of New York
Filed Nov. 29, 1963, Ser. No. 326,908
7 Claims. (Cl. 219—393)

The present invention relates to domestic ovens and particularly to an accessory package or conversion kit for transforming a standard baking oven into a high temperature self-cleaning oven. Hence, food soil lodged on the oven walls may be chemically decomposed by heat into gaseous products fundamentally by a pyrolytic step, and thereby removed from the oven except for perhaps a small amount of ash that might remain in the bottom of the oven in situations of heavy loads of food soil.

A major annoyance in using an oven is the difficulty encountered in keeping the walls of the oven liner clean. During the normal cooking operations food particles and grease spatterings often lodge on the hot oven surfaces where they are partially baked on, so that they not only discolor to a burnt appearance, but what is far more objectionable, they adhere tenaciously to the surfaces.

One approach for solving this cleaning chore is the use of an oven with a high temperature heat-cleaning cycle as is described and claimed in the copending application of Bohdan Hurko, Serial No. 244,493 filed December 13, 1962, now Patent No. 3,121,158, which application is assigned to the General Electric Company, the assignee of the present invention. In such an oven the temperature is allowed to rise above the normal cooking temperatures of between about 150° F. and 550° F. to a heat-cleaning temperature range extending somewhere between about 750° F. and 950° F. at which temperatures the food soil will be decomposed or degraded and the corresponding gaseous degradation products are passed through an oxidation unit and finally exhausted to the exterior of the oven cavity so as to prevent a subsequent condensation thereof upon the interior surfaces of the oven liner. The present invention is concerned with an accessory package or conversion kit that may be provided for a conventional oven so that the oven may be provided with or without the high temperature self-cleaning features.

The principal object of the present invention is to provide a domestic oven with an accessory package or conversion kit that is useable within a conventional oven so as to convert the oven to a high temperature oven so that food soil lodged on the oven walls may be automatically removed by the action of pyrolysis.

A further object of the present invention is to provide an insulated shielding means for the oven thermostat temperature sensor located within an oven so that the temperature of the sensor will lag the oven air temperature, with the inclusion of an oxidation unit with the shielding means for degrading the gaseous products generated within the oven during a self-cleaning oven operation.

A further object of the present invention is to provide an accessory package of the class described with an additional heating unit suspended from the package adjacent the oven door to compensate for heat lost through and around the door so as to obtain generally uniform oven wall temperatures.

A further object of the present invention is to provide an accessory package of the class described which is installed in place of the upper electrical broil heating unit of the plug-in type provided for the oven.

A still further object of the present invention is to provide an accessory package of the class described where the oven has a venting system that is aligned with an exhaust port of the oxidation unit when the package is installed within the oven.

The present invention, in accordance with one form thereof, is embodied in a shielding means for a temperature sensor located within an oven cavity. This shielding means comprises an insulated box that is adapted to be supported within the upper portion of the oven so as to cover the temperature sensor and provide a temperature lag of the sensor temperature with relation to the oven air temperature. Gases are formed within the oven cavity during the operation thereof and an oxidation unit is included with the shielding means to degrade the gaseous products generated within the oven. This oxidation unit is provided with electrical terminal means that is connected into the oven when the shielding means is mounted therein. The oxidation unit has an exhaust port that is adapted to be aligned with a venting duct of the oven so as to prevent any recondensation of the food soil on the interior surfaces of the oven. Moreover, an additional heating unit is suspended from the shielding means adjacent the access door of the oven so as to compensate for heat lost through and around the door and thereby obtain generally uniform temperatures on the walls forming the oven cavity.

My invention will be better understood from the following description taken in conjunction with the accompanying drawings and its scope will be pointed out in the appended claims.

FIGURE 2 is a fragmentary exploded view of a small portion of the back of the oven liner of FIGURE 1 showing in more detail the oven temperature sensor as well as (1) the shielding means or insulated box member for covering the sensor, (2) the oxidation unit and (3) an additional heating unit suspended from the front portion thereof;

FIGURE 3 is a fragmentary front elevational view looking directly into the front of the oven taken on the lines 3—3 of FIGURE 1 and showing the nature of the sliding support means for the accessory package within the top portion of the oven cavity.

Figure 1:
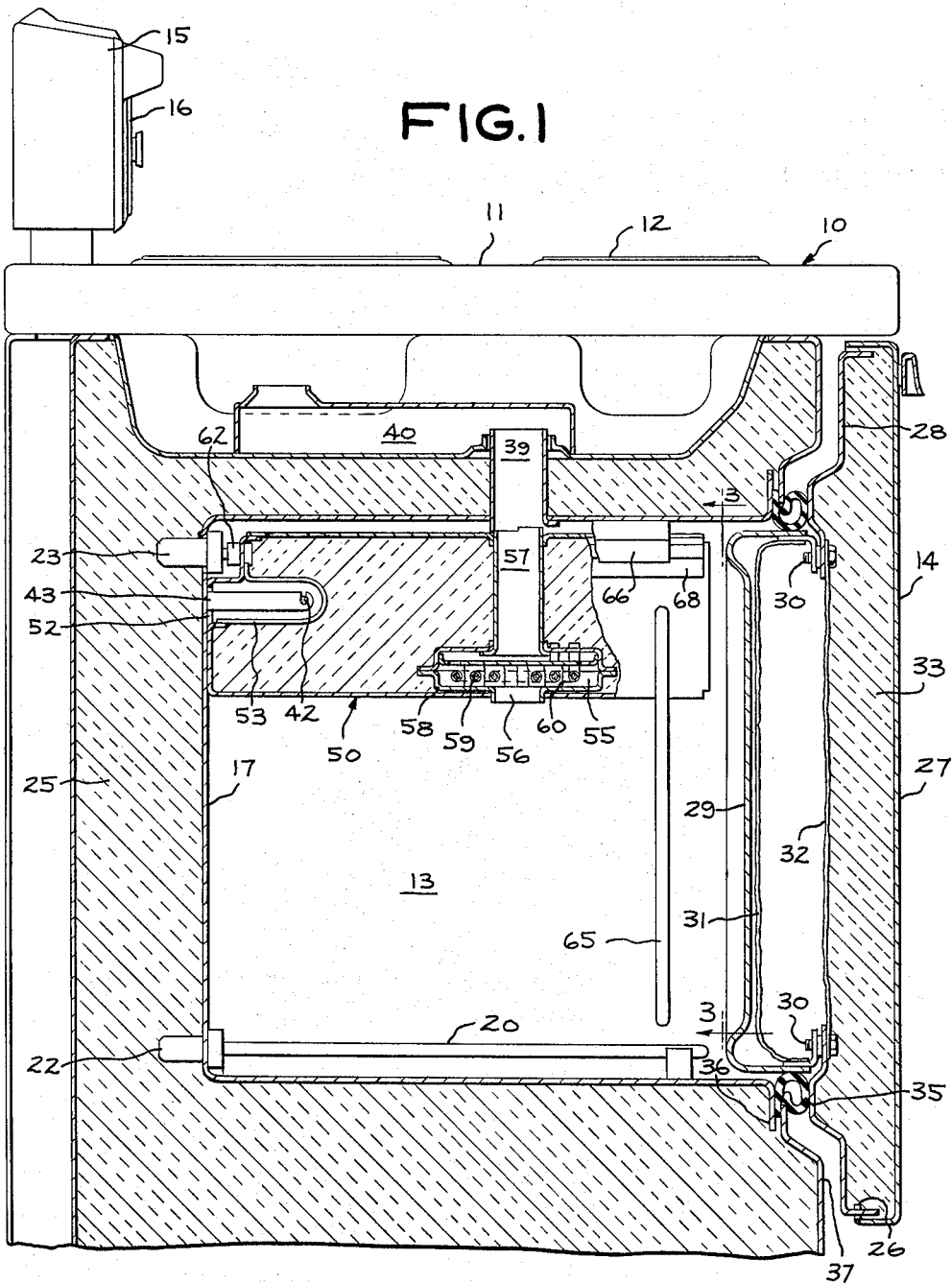
FIGURE 1 is a left side elevational view partly in cross-section of a free-standing electric range having an oven that is equipped with the accessory package embodying the present invention that is connected in place of the normal plug-in type upper broil unit.

Turning now to a consideration of the drawings and in particular to FIGURE 1 there is shown for illustrative purposes a free-standing electric range having a body or cabinet structure 10 with a top cooking surface 11 that has a plurality of surface heating elements 12, an oven cavity 13 beneath the cooktop, a front-opening drop-door 14 for the oven, and a backsplash 15 arranged along the back edge of the cooking surface 11 and containing a control panel 16 in the front face thereof which includes a plurality of manual control devices which govern the energization of the various heating elements of the range. The oven cavity 13 is formed by an enameled oven liner 17 of box-like construction that has an open front that is adapted to be closed by the door 14 mentioned previously.

As in most conventional electric ovens there is a lower heating element or bake unit 20 positioned adjacent the bottom wall of the oven liner and an upper heating element or broil unit (not shown) usually arranged just below the top wall of the oven liner. The upper broil unit is oftentimes provided with a metal reflector that overlies the broil unit and causes the majority of the energy developed by the unit to be directed down toward the food placed under it with a searchlight pattern of heat. Both of the bake and broil heating elements are provided with terminal blades that are adapted to plug into electrical connectors 22 and 23 respectively which are each mounted in an opening in the back wall of the oven liner.

It is preferred that the upper broil unit should be of the plug-in type for reasons which will become apparent hereinafter, but the lower bake unit 20 could be screw-fastened to the oven liner as is also common in this art. The oven liner 17 is insulated from the range body 10 by having a relatively thick blanket of thermal insulation 25 of fiberglass or the like material surrounding the liner. This is in order to prevent the waste of heat energy from the oven cavity as well as to maintain the temperature of the outer walls of the range body below an amount which would be uncomfortable to the human touch when the heating elements are energized.

Precautions are also taken in the design of the oven door 14 to reduce the heat lost through and around the door. For example, the door is constructed of three main elements; namely, the outer door panel 27, a frame-like inner door panel 28 that is connected thereto, and an inner door liner 29 that is adapted to protrude into the front opening of the oven liner as is best shown in FIGURE 1. There is a limited amount of metal-to-metal contact between the various door elements by means of widely spaced tabs 26 and fastening screws 30 so as to reduce the amount of conduction of heat through the door. Moreover, the door is insulated as for example by multiple sheets or layers of aluminum foil 31 and 32 as well as by a blanket of fiberglass insulation 33.

Another potential source of oven heat loss would be at the front of the oven between the oven liner 17 and the range body 10. The method of supporting the oven liner in the body is not illustrated, but an insulating gasket 35 is shown as being sandwiched between a front flange 36 of the oven liner and the front wall 37 of the range body so as to provide a thermal gap therebetween as well as serve the secondary purpose of a door gasket which is compressed by the door when the door is closed, as is illustrated. Obviously, there are many possible alternatives to the method of mounting the oven liner and reducing the heat loss from the oven, but this does not form part of the present invention so further elaboration is not deemed necessary.

As the temperature in a standard oven is raised, smoke and odors are sometimes developed as well as the air velocities and pressures are increased. Thus, it is desirable to have an exhaust system for the oven such as a venting duct 39 shown in the top wall of the oven liner as a vertical section that communicates with a horizontal duct 40 underlying the cooktop 11 so as to discharge the gases under one of the surface units 12 from which the gases are returned to the kitchen atmosphere.

As is normal, the oven temperature is controlled by an oven selector switch and an oven thermostat (not shown) where the switch selects the necessary heating circuit whether it be for baking, broiling or time baking, while the oven thermostat is set to a predetermined baking temperature or to a set broiling temperature which is usually a maximum cooking temperature condition. Accordingly, the thermostat must be provided with a temperature sensing device usually located within the oven cavity for determining the oven temperature and signaling this degree of temperature to the oven thermostat so that the thermostat may act upon this information and control this temperature to the degree predetermined by the thermostat setting. Such a sensing device is represented by thermostat bulb 42 as is best seen in FIGURE 2 which is of the elongated tubular shape and supported by a pair of bracket arms 43 and 44 from the back wall of the oven liner adjacent the top portion thereof. This bulb 42 is connected to a capillary tube 45 that extends out through an opening in the oven liner and is joined to the thermostat that is positioned in the control panel 16 of the backsplash 15. A temperature-responsive fluid fills the bulb and capillary tube and is adapted to act upon a bellows or diaphragm of the thermostat.

This thermostat may be of many different designs but a suitable example is disclosed in the United States patent to W. J. Ettinger 2,260,014 dated October 21, 1941. The temperature responsive fluid in this thermostat system may be phenyl diphenyl chloride, or some other similar high temperature compounds being marketed under various chemical trade names. These fluids for use in hydraulic thermostat systems could not be used in a high temperature oven because the fluid will not withstand a temperature much above 650° F. before it starts to chemically decompose and lose its important properties. Also, the copper bulb and capillary tube begins to soften and oxidize at about 700° F. This oxidation action can continue for only a short time before the fluid will begin to leak out of the system and render the thermostat inoperative.

The range, and specifically the oven structure, which has been explained in detail above, represents more or less conventional design practice in the domestic range industry. As explained previously, the present invention pertains to an accessory package or conversion kit which may be used with this standard range for removing baked-on food soils from the oven liner walls by the action of pyrolysis and without the use of strong chemical agents, and hand scrubbing and scraping. For example, this invention pertains to an accessory package in the form of an insulated box 50 of sheet metal construction which is adapted to be supported in the upper portion of the oven liner to shield the temperature sensor or thermostat bulb 42 from the oven temperatures. Hence, a temperature lag is created between the bulb and the oven air so that the maximum bulb temperature does not exceed about 600° F., while the maximum oven air temperature does not exceed about 950° F. However, the oven air does approach this high temperature in order to thermally decompose the food soil into gaseous degradation products and a slight amount of ash without ignition of any kind and without the production of carbon monoxide gas. For example the thermostat would be set to a bake temperature of about 550° F., and when the bulb temperature reaches this amount the heating elements would be de-energized, although the oven air temperature might at the same time be approaching 950° F. Then the oven air would cool down for a length of time so as to permit the bulb to drop in temperature below the set thermostat temperature of about 550° F. Once the bulb temperature drops, the thermostat contacts will close and energize the heating elements to again raise the oven air temperature to about 950° F. and again repeat another cycle.

This may be explained as "fooling" the thermostat bulb by use of a shielding means or insulated box 50. This shielding system could also be used with an electrical resistance thermostat sensor as well as with the hydraulic bulb which has been specifically discussed in the example given above. The back wall of this box is provided with a narrow elongated slot 52 which is adapted to receive the bulb 42 and the support arms 43 and 44 and a short length of the capillary tube 45 so that the box may be moved into contact with the back wall of the oven liner 17. Thus, the box 50 has a slotted back wall that is configured to form a pocket 53 which neatly receives the bulb in an insulated compartment.

The proposed high temperature treatment of the food soil baked onto the walls of the oven liner degrades the soils by a process of pyrolysis. This is accomplished without the ignition of either the food soil products or the gaseous primary and secondary degradation products whereby there is no burning of such products in the oven in the proper chemical sense of this term. However, it is important to provide a suitable oxidizing unit 55 such as a catalytic smoke eliminator to treat the generated gases to eliminate any presence of free carbon or soot and carbon monoxide gases. This unit is located within the insulated box 50 and it has a lower inlet port 56 in the bottom of the box and an upper outlet port 57 in the top wall of the box so as to be aligned with the venting duct 39 located in the top wall of the oven liner when the box is properly installed in the oven.

A suitable oxidizing unit is disclosed in United States Patent No. 2,900,483 granted on August 18, 1959, to Stanley B. Welch. This unit has an outer casing 58 that houses an electric heating element 59 in spiral form and a wire screen 60 that is intermeshed therewith. This screen is coated with a catalytic material, such as, for example, platium, that is especially adapted to promote the oxidation of carbon and carbon products so as to eliminate smoke, carbon monoxide, vapors and other objectionable products exhausted from the oven cavity.

The heating element 59 of the oxidation unit is provided with lead wires (not shown) that extend to the back wall of the box 50 where they are connected into a terminal plug 62 that extends through an opening in the wall. This attachment plug has a pair of contact blades 63 as is best seen in FIGURE 2 for insertion into the connector block 23 located in the back wall of the oven liner. In other words, the insulated box 50 or shielding member is adapted to be substituted for the upper broil heating unit by first removing the broil unit and inserting the contact blade 63 of the box into the connector block 23. Admittedly, in a gas oven there would be no upper broil electrical heating unit, but the connector block 23 could still be provided for making electrical engagement with the box termnials 63. Thus, the energization of the power circuit will energize the bake unit 20 and the oxidation unit 55 in the insulated box 50. The depth of the box 50 is only slightly less than the depth of the oven liner to provide the necessary separation between the oxidation unit 55 and the temperature sensor 42 so that the bulb is not unduly heated by the heating element 59 in the oxidation unit.

In order to obtain a completely satisfactory cleaning job throughout all areas and crevices of the oven liner so that no hand scrubbing is necessary, it has been found important to compensate for the heat lost through and around the door 14 and obtain generally uniform oven wall temperatures. This added heat can be supplied by an additional heating element 65 which is of looped form and suspended from the front portion of the insulated box 50 as is clearly shown in FIGURE 2. This heating element is adapted to hand adjacent the inner panel 29 of the access door so as to generally parallel the door gap between the door and the range body or front opening of the oven liner. This heating element 65 would be energized from the same terminal block 62 in the back wall of the insulated box and preferably it is in series with the heating element 59 of the oxidation unit 55. This additional heating element 65 is preferably pivotally mounted so that when the box is to be stored in the kitchen the heating element may be swung up and over the top wall of the box to present a compact package that will easily fit into the drawer (not shown) of the range that would be located directly beneath the oven compartment 13.

During the heat-cleaning operation the heating circuit would include the bake unit 20 which may be of 2000 watts capacity, for example, connected in a series circuit with both the additional heating element or mullion heater 65 which, for example, may be of about 300 effective watts and the heating element 59 of the oxidation unit 55 across a high voltage source of power of 236 volts. This provides rapid heat-up cycles to compensate for the relatively slow cool-down periods once the bulb temperature reaches the set temperature on the thermostat of about 550° F. The housewife would monitor the heat-cleaning operation and terminate it whenever she felt sufficient soil had been removed.

As to the method of supporting the insulated box 50, this is best illustrated in FIGURES 1 and 3. The latter figure shows guide rails 66 and 67 attached to the top wall of the oven liner and extending from front-to-back thereof. Hence, the box 50 may be inserted into the oven liner in the manner of a drawer on suitable slide runners 68 and 69 fastened at each side of the box for cooperation with the guide rails. In addition, the insertion of the contact blades 63 of the terminal plug 62 of the box into the connector block 23 in the back wall of the oven liner carries some of the weight of the box to the oven liner. Moreover, the depth of the box is such that the oven door 14 will not close completely unless the box is electrically connected into the connector block 22.

Modifications of this invention will occur to those skilled in this art; therefore, it is to be understood that this invention is not limited to the particular embodiments enclosed, but that it is intended to cover all modifications which are within the true spirit and scope of this invention as claimed.

What I claim as new and desire to secure by Letters Patent of the United States is:

1. An accessory device for an oven comprising a closed box member supporting therein an electrically operated catalytic oxidation unit that has an intake port adjacent a bottom wall thereof, heat insulating material included in the box, one wall of the box being configured to provide a pocket that is adapted to receive a fluid-filled bulb of a hydraulic thermostat control system for the oven so as to shield the bulb from the oven temperatures, the box including electrical terminal means external thereof and adapted to be engageable with electrical connector means of the oven, and electrical conductor means joining the oxidation unit to the terminal means, support means adapted to hold the box in the upper portion of the oven, said oxidation unit having an exhaust port that is adapted to be in a position to deliver the products of oxidation to an oven venting system.

2. A shielding device for a fluid-filled bulb of a hydraulic thermostatic control system of a domestic oven, said device comprising a box member having one wall configured to provide a pocket that is adapted to fit over the bulb, the box being insulated to protect the bulb from the oven temperatures and provide a temperature lag of the bulb temperature behind the oven temperature so that the maximum bulb temperature does not exceed about 650° F. while the maximum oven air temperature does not exceed about 950° F., a catalytic oxidation unit positioned within the box and thermally insulated from the bulb-receiving pocket, the oxidation unit having electrical terminal means external of the box and adapted to be engageable in an electrical connector means of the oven, the box being provided with support means which are adapted to cooperate with mating support means within an oven for holding the box in an elevated position within the oven, the oxidation unit having an intake port adjacent the bottom of the box and an exhaust port adjacent the top of the box, the exhaust port being adapted to be aligned with an oven venting system so as to deliver the products of oxidation externally of the oven.

3. A shielding device as recited in claim 2 with the addition of a looped resistance heating unit suspended from the front portion of the box and electrically connected to the said terminal means so as to be energized when the oxidation unit is energized, the heating unit being adapted to be positioned adjacent an access door of the oven so as to compensate for the heat lost through and around the door.

4. A cooking apparatus comprising walls defining an oven cavity, one wall of the cavity including a door for gaining access thereto, heating means for the cavity for supplying heat for cooking food placed therein, a thermostatic control system for the oven including a temperature sensor positioned within the oven cavity, a removable shielding device for the temperature sensor to create a temperature lag between the actual oven temperature and the sensed temperature, said shielding device comprising an insulated box member which is adapted to fit over the sensor and against the oven wall, the box including an electrically-operated oxidation unit with terminal means adjacent the back wall of the box, an electrical connector mounted in said wall and engageable by the said terminal means, the oxidation unit having an intake port adjacent the bottom of the box and an exhaust port adjacent the top of the box, and support means within the oven for holding the box within the upper portion thereof, the oven including a venting duct in the top wall thereof so that the exhaust port of the oxidation unit is aligned with the venting duct when the box is supported in the oven and the terminal means is located in the connector.

5. A cooking apparatus as recited in claim 4 with the addition of an electrical resistance heating unit in the form of a rectangular loop electrically connected to the terminal means and suspended from the front portion of the box adjacent the access door so as to compensate for heat lost through and around the door.

6. An electric oven comprising a cabinet structure with an insulated oven liner and a front-opening access door that forms an oven cooking cavity, heating means for said cavity including an upper electrical broil heating unit, a lower electrical bake heating unit, and temperature control means for said heating means settable to controlling conditions for obtaining various temperature combinations in the normal cooking range between about 150° F. and 550° F., said control means including a temperature sensor located within the oven liner adjacent the upper broil unit; the invention comprising shielding means for converting the oven to a high temperature self-cleaning oven that will operate in a temperature range between about 750° F. and 950° F. to chemically decompose food soil lodged on the oven cavity walls, said shielding means being an insulated box that is adapted to be supported over the temperature sensor once the upper broil unit has been removed so as to cause the temperature of the sensor to lag the actual oven air temperature so that the maximum sensor temperature does not exceed about 600° F. while the oven air temperature may rise to a maximum temperature of about 950° F., said box including a smoke-eliminating oxidation unit having electrical terminals which are adapted to be connected into the control heating circuit in place of the upper broil unit, the oven liner including a venting duct, the oxidation unit being exhausted through the venting duct during the high temperature operation, and an additional electrical heating unit in the form of a loop pivotally suspended from the front portion of the box adjacent the door and in an electrical circuit with the oxidation unit and the lower bake unit.

7. A cooking apparatus comprising walls defining an oven cavity, one wall of the cavity including a door for gaining access thereto, heating means for the cavity for supplying heat for cooking food placed therein, a thermostatic control system for the oven including a temperature sensor positioned within the oven cavity for obtaining various temperature combinations in the normal cooking range between about 150° F. and 550° F.; the invention comprising a means for converting the oven to a high temperature self-cleaning oven that will operate in a temperature range between about 750° F. and 950° F. to chemically decompose food soil lodged on the oven cavity walls, an accessory package including a box member supporting therein an electrically operated oxidation unit having terminal means adjacent the back wall of the box, an electrical connector mounted in the back wall forming part of the oven cavity and engageable by said terminal means, the oxidation unit having an intake port adjacent the bottom of the box and an exhaust port adjacent the top of the box, and support means within the oven for holding the box within the upper portion thereof, the oven including a venting duct in the top wall thereof so that the exhaust port of the oxidation unit is aligned with the venting duct when the box is supported in the oven and the terminal means is located in the connector, an electrical resistance heating unit in the form of a rectangular loop electrically connected to the terminal means and suspended from the front portion of the box adjacent the access door so as to compensate for heat lost through and around the door.

References Cited by the Examiner
UNITED STATES PATENTS

| 2,900,483 | 8/1959 | Welch | 219—306 |
| 3,024,344 | 3/1962 | Dills | 219—391 X |
| 3,059,088 | 10/1962 | Eff | 219—414 X |
| 3,082,311 | 3/1963 | Chisholm | 219—413 |

RICHARD M. WOOD, *Primary Examiner.*

C. L. ALBRITTON, *Assistant Examiner.*